United States Patent [19]

Fiene et al.

[11] Patent Number: 5,265,258
[45] Date of Patent: Nov. 23, 1993

[54] PARTIAL-SIZED PRIORITY ENCODER CIRCUIT HAVING LOOK-AHEAD CAPABILITY

[75] Inventors: Eric V. Fiene; Gary A. Mussemann, both of Austin, Tex.

[73] Assignee: Motorola, Inc., Schaumburg, Ill.

[21] Appl. No.: 671,236

[22] Filed: Mar. 19, 1991

[51] Int. Cl.$^5$ .................. G06F 7/00; G06F 13/00
[52] U.S. Cl. ......................... 395/725; 341/160; 364/259.9; 364/247; 364/241.2; 364/DIG. 1; 364/715.1
[58] Field of Search ............... 395/725, 275, 650, 775, 395/800; 364/715.1; 341/160; 340/825.5, 825.51, 825.56; 370/85.6

[56] References Cited

U.S. PATENT DOCUMENTS

| | | | |
|---|---|---|---|
| 4,348,741 | 9/1982 | McAlister | 364/900 |
| 4,887,084 | 12/1989 | Yamaguchi | 341/160 |
| 4,924,421 | 5/1990 | Seguchi | 364/715.1 |
| 5,083,261 | 1/1992 | Wilkie | 395/725 |
| 5,091,874 | 2/1992 | Watanabe et al. | 364/715.1 |
| 5,095,460 | 3/1992 | Rodeheffer | 395/650 |
| 5,123,105 | 6/1992 | Wyland et al. | 395/725 |
| 5,160,923 | 11/1992 | Sugawara et al. | 340/825.51 |

*Primary Examiner*—Michael R. Fleming
*Assistant Examiner*—Gopal C. Ray
*Attorney, Agent, or Firm*—Charlotte B. Whitaker; Walter W. Nielsen

[57] ABSTRACT

In an integrated circuit microprocessor, an M-bit priority encoder circuit indicates the highest priority bit position that is set in a first portion of an N-bit (N generally being greater than M) data word and provides control information regarding the number of bits that are set. If more than one bit is set, the highest priority bit is reset, the first portion is re-analyzed, and highest priority bit information and control information are again provided. If only one bit or no bit is set in the first portion, a second portion is analyzed, and highest priority bit information and control information regarding the second portion is provided. Analysis of the second portion, and of any subsequent portions, continues in similar fashion until no further bit positions are determined to be set in the data word.

19 Claims, 8 Drawing Sheets

| emovm[7] | emovm[6] | emovm[5] | emovm[4] | emovm[3] | emovm[2] | emovm[1] | emovm[0] | emovmpt[4] | emovmpt[3] | emovmpt[2] | emovmpt[1] | emovmpt[0] | eclrbit[7] | eclrbit[6] | eclrbit[5] | eclrbit[4] | eclrbit[3] | eclrbit[2] | eclrbit[1] | eclrbit[0] |
|---|---|---|---|---|---|---|---|---|---|---|---|---|---|---|---|---|---|---|---|---|
| 0 | 0 | 0 | 0 | 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 | 0 | 0 | 0 | 0 | 1 |
| X | X | X | X | X | X | 1 | 1 | 0 | 0 | 0 | 0 | 0 | 0 | 0 | 0 | 0 | 0 | 0 | 0 | 1 |
| X | X | X | X | X | 1 | 0 | 1 | 0 | 0 | 0 | 0 | 0 | 0 | 0 | 0 | 0 | 0 | 0 | 0 | 1 |
| X | X | X | X | 1 | 0 | 0 | 1 | 0 | 0 | 0 | 0 | 0 | 0 | 0 | 0 | 0 | 0 | 0 | 0 | 1 |
| X | X | X | 1 | 0 | 0 | 0 | 1 | 0 | 0 | 0 | 0 | 0 | 0 | 0 | 0 | 0 | 0 | 0 | 0 | 1 |
| X | X | 1 | 0 | 0 | 0 | 0 | 1 | 0 | 0 | 0 | 0 | 0 | 0 | 0 | 0 | 0 | 0 | 0 | 0 | 1 |
| X | 1 | 0 | 0 | 0 | 0 | 0 | 1 | 0 | 0 | 0 | 0 | 0 | 0 | 0 | 0 | 0 | 0 | 0 | 0 | 1 |
| 1 | 0 | 0 | 0 | 0 | 0 | 0 | 1 | 0 | 0 | 0 | 0 | 0 | 0 | 0 | 0 | 0 | 0 | 0 | 0 | 1 |
| 0 | 0 | 0 | 0 | 0 | 0 | 1 | 0 | 1 | 0 | 0 | 0 | 1 | 0 | 0 | 0 | 0 | 0 | 0 | 1 | 0 |
| X | X | X | X | X | 1 | 1 | 0 | 0 | 0 | 0 | 0 | 1 | 0 | 0 | 0 | 0 | 0 | 0 | 1 | 0 |
| X | X | X | X | 1 | 0 | 1 | 0 | 0 | 0 | 0 | 0 | 1 | 0 | 0 | 0 | 0 | 0 | 0 | 1 | 0 |
| X | X | X | 1 | 0 | 0 | 1 | 0 | 0 | 0 | 0 | 0 | 1 | 0 | 0 | 0 | 0 | 0 | 0 | 1 | 0 |
| X | X | 1 | 0 | 0 | 0 | 1 | 0 | 0 | 0 | 0 | 0 | 1 | 0 | 0 | 0 | 0 | 0 | 0 | 1 | 0 |
| X | 1 | 0 | 0 | 0 | 0 | 1 | 0 | 0 | 0 | 0 | 0 | 1 | 0 | 0 | 0 | 0 | 0 | 0 | 1 | 0 |
| 1 | 0 | 0 | 0 | 0 | 0 | 1 | 0 | 0 | 0 | 0 | 0 | 1 | 0 | 0 | 0 | 0 | 0 | 0 | 1 | 0 |
| 0 | 0 | 0 | 0 | 0 | 1 | 0 | 0 | 1 | 0 | 0 | 1 | 0 | 0 | 0 | 0 | 0 | 0 | 1 | 0 | 0 |
| X | X | X | X | 1 | 1 | 0 | 0 | 0 | 0 | 0 | 1 | 0 | 0 | 0 | 0 | 0 | 0 | 1 | 0 | 0 |
| X | X | X | 1 | 0 | 1 | 0 | 0 | 0 | 0 | 0 | 1 | 0 | 0 | 0 | 0 | 0 | 0 | 1 | 0 | 0 |
| X | X | 1 | 0 | 0 | 1 | 0 | 0 | 0 | 0 | 0 | 1 | 0 | 0 | 0 | 0 | 0 | 0 | 1 | 0 | 0 |
| X | 1 | 0 | 0 | 0 | 1 | 0 | 0 | 0 | 0 | 0 | 1 | 0 | 0 | 0 | 0 | 0 | 0 | 1 | 0 | 0 |
| 1 | 0 | 0 | 0 | 0 | 1 | 0 | 0 | 0 | 0 | 0 | 1 | 0 | 0 | 0 | 0 | 0 | 0 | 1 | 0 | 0 |
| 0 | 0 | 0 | 0 | 1 | 0 | 0 | 0 | 1 | 0 | 0 | 1 | 1 | 0 | 0 | 0 | 0 | 1 | 0 | 0 | 0 |
| X | X | X | 1 | 1 | 0 | 0 | 0 | 0 | 0 | 0 | 1 | 1 | 0 | 0 | 0 | 0 | 1 | 0 | 0 | 0 |
| X | X | 1 | 0 | 1 | 0 | 0 | 0 | 0 | 0 | 0 | 1 | 1 | 0 | 0 | 0 | 0 | 1 | 0 | 0 | 0 |
| X | 1 | 0 | 0 | 1 | 0 | 0 | 0 | 0 | 0 | 0 | 1 | 1 | 0 | 0 | 0 | 0 | 1 | 0 | 0 | 0 |
| 1 | 0 | 0 | 0 | 1 | 0 | 0 | 0 | 0 | 0 | 0 | 1 | 1 | 0 | 0 | 0 | 0 | 1 | 0 | 0 | 0 |
| 0 | 0 | 0 | 1 | 0 | 0 | 0 | 0 | 1 | 0 | 1 | 0 | 0 | 0 | 0 | 0 | 1 | 0 | 0 | 0 | 0 |
| X | X | 1 | 1 | 0 | 0 | 0 | 0 | 0 | 0 | 1 | 0 | 0 | 0 | 0 | 0 | 1 | 0 | 0 | 0 | 0 |
| X | 1 | 0 | 1 | 0 | 0 | 0 | 0 | 0 | 0 | 1 | 0 | 0 | 0 | 0 | 0 | 1 | 0 | 0 | 0 | 0 |
| 1 | 0 | 0 | 1 | 0 | 0 | 0 | 0 | 0 | 0 | 1 | 0 | 0 | 0 | 0 | 0 | 1 | 0 | 0 | 0 | 0 |
| 0 | 0 | 1 | 0 | 0 | 0 | 0 | 0 | 1 | 0 | 1 | 0 | 1 | 0 | 0 | 1 | 0 | 0 | 0 | 0 | 0 |
| X | 1 | 1 | 0 | 0 | 0 | 0 | 0 | 0 | 0 | 1 | 0 | 1 | 0 | 0 | 1 | 0 | 0 | 0 | 0 | 0 |
| 1 | 0 | 1 | 0 | 0 | 0 | 0 | 0 | 0 | 0 | 1 | 0 | 1 | 0 | 0 | 1 | 0 | 0 | 0 | 0 | 0 |
| 0 | 1 | 0 | 0 | 0 | 0 | 0 | 0 | 1 | 0 | 1 | 1 | 0 | 0 | 1 | 0 | 0 | 0 | 0 | 0 | 0 |
| 1 | 1 | 0 | 0 | 0 | 0 | 0 | 0 | 0 | 0 | 1 | 1 | 0 | 0 | 1 | 0 | 0 | 0 | 0 | 0 | 0 |
| 1 | 0 | 0 | 0 | 0 | 0 | 0 | 0 | 1 | 0 | 1 | 1 | 1 | 1 | 0 | 0 | 0 | 0 | 0 | 0 | 0 |

*FIG. 7*

| emovmdir | emovmpt[2] | emovmpt[1] | emovmpt[0] | earptls[2] | earptls[1] | earptls[0] |
|---|---|---|---|---|---|---|
| 0 | 0 | 0 | 0 | 0 | 0 | 0 |
| 0 | 0 | 0 | 1 | 0 | 0 | 1 |
| 0 | 0 | 1 | 0 | 0 | 1 | 1 |
| 0 | 0 | 1 | 1 | 0 | 1 | 0 |
| 0 | 1 | 0 | 0 | 1 | 1 | 0 |
| 0 | 1 | 0 | 1 | 1 | 1 | 1 |
| 0 | 1 | 1 | 0 | 1 | 0 | 1 |
| 0 | 1 | 1 | 1 | 1 | 0 | 0 |
| 1 | 0 | 0 | 0 | 1 | 0 | 0 |
| 1 | 0 | 0 | 1 | 1 | 0 | 1 |
| 1 | 0 | 1 | 0 | 1 | 1 | 1 |
| 1 | 0 | 1 | 1 | 1 | 1 | 0 |
| 1 | 1 | 0 | 0 | 0 | 1 | 0 |
| 1 | 1 | 0 | 1 | 0 | 1 | 1 |
| 1 | 1 | 1 | 0 | 0 | 0 | 1 |
| 1 | 1 | 1 | 1 | 0 | 0 | 0 |

*FIG. 8*

| ecycle_movm | emovmpt[4] | emovmpt[3] | ehload | eclear |
|---|---|---|---|---|
| 0 | X | X | 0 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 0 |

PARTIAL-SIZED PRIORITY ENCODER CIRCUIT HAVING LOOK-AHEAD CAPABILITY

TECHNICAL FIELD

This invention relates generally to data processing systems and, in particular, to a priority encoder circuit and a method for using same.

BACKGROUND OF THE INVENTION

As is well known, data processing systems including microprocessors are generally equipped with various data and address registers which either temporarily store information which is to be transferred to memory in a WRITE operation or which receive information from memory in a READ operation. In some instances, it is necessary to store information into or extract information from selected ones of this plurality of registers in accordance with some predefined priority scheme.

For example, the MC68000 series of microprocessors generally available from Motorola, Inc. utilizes a "load and store multiple" instruction (MOVEM) which causes information stored in various registers in the microprocessor to be stored into memory or vice versa.

For this purpose, a multi-bit data word is constructed within the microprocessor which indicates which registers are to be manipulated and in what priority. For example, if each of the individual bits of the data word represent separate and distinct registers, then a logical one in any particular bit position may be interpreted to indicate that its associated register is to be either read into or read from.

Furthermore, the relative priority of operations associated with any one particular register with respect to the others may be determined by the relative position of its associated bit in the data word.

Thus, for example, a register whose associated bit occupies the least significant bit position of the data word may be given highest priority while one associated with the most significant bit position may be given the lowest priority.

It is necessary, however, to monitor each of the bit positions in order to detect the bit position of highest priority containing a logical one so as to perform the required operation on its associated register, the bit position containing a logical one of the next highest priority in order to perform the required operation on its associated register, and so on down the line until the correct operation has been performed on each register whose associated bit in the data word is a logical one.

A known priority encoder provides a separate channel for each bit of the binary data word whose bits it is desired to prioritize.

It is desirable to provide a priority encoder which can operate at a speed comparable to that of the other essential elements of the microprocessor, for example, the execution unit and the effective address unit. In general, the speed of a priority encoder corresponds linearly to the number of bits. Thus an 8-bit encoder runs approximately twice as fast as a 16-bit encoder. It is therefore desirable to provide a priority encoder that operates on fewer than the maximum number of bits in the data word being analyzed.

High performance microprocessors, such as Motorola's MC68000 line of microprocessors, are highly pipe-lined. That is, the microcode which controls many of their internal operations is executed in an overlapping manner rather than in a purely sequential manner. It is desirable to utilize the pipe-lining capabilities inherent in such microprocessors by providing relatively more complete control information from the output of the priority encoder than is provided by known priority encoders, which typically provide merely an indication of whether the data word being analyzed is zero or non-zero.

In addition, in the MC68040 microprocessor, the data and address registers are separated into two different execution units, namely an effective address unit and an instruction execution unit. Again, more complete control information is required to achieve optimum operation of microcode branching operations without requiring additional logic circuitry.

Therefore it is also desirable to provide as outputs from a priority encoder not only a pointer to the most significant bit which is set in the data word, but also control information in the form of an indication as to whether 1) there are zero bits set, 2) there is one bit set, or 3) there is more than one bit set. This indication can be used by microcode to branch upon the appropriate conditions.

It is also desirable to provide a priority encoder circuit which occupies a minimum of silicon area on a microprocessor chip.

BRIEF SUMMARY OF INVENTION

The present invention provides a high speed partial-sized priority encoder circuit for analyzing an N-bit data word by first examining a first portion of the data word, identifying the highest priority bit set in the first portion, then examining a subsequent portion of the data word, and identifying the highest priority bit set therein. Simultaneously with generating the results of each analysis the circuit generates an indication regarding the number of bits that were found to be set within the portion under analysis. Thus the circuit indicates whether zero, one, or multiple bits are set therein.

In a preferred embodiment the priority encoder examines half of the N bits of the data word at a time. Because of the reduced size of the circuit, and because of the added control information generated regarding the number of bits that were found to be set, the priority encoder runs at a speed which is compatible with that of the other microprocessor internal components, the end result being that the MOVEM instruction is executed at a rate of one register moved per clock cycle.

Accordingly, it is an advantage of the partial-sized priority encoder of the present invention that it is capable of high speed operation.

It is another advantage of the partial-sized priority encoder of the present invention that it analyzes only a portion of a data word at a time.

It is also an advantage of the partial-sized priority encoder of the present invention that it generates additional control information concerning the number of bits that were found to be set in the portion of the data word under analysis.

These and other advantages are achieved in accordance with one aspect of the invention by providing a priority encoder circuit for identifying the highest priority bit set in an N-bit data word, the circuit comprising an M-bit logic circuit, responsive to a first portion of the data word, for identifying the highest priority bit, if any, set in the first portion of the data word, and for providing an indication of whether zero, one, or multiple bits are set therein; control logic, responsive to an indication that multiple bits are set in the first portion of the data word, for resetting the highest priority bit and causing the logic circuit again to identify the highest priority bit, if any, set in the first portion of the data word, and to provide an indication of whether zero, one, or multiple bits are set therein; and the control logic, responsive to an indication that zero bits are set or one bit is set in the first portion of the data word, causing the logic circuit to identify the highest priority bit, if any, set in the second portion of the data word, and to provide an indication of whether zero, one, or multiple bits are set therein.

According to a further aspect of the invention there is provided a method for identifying the highest priority bit set in an N-bit data word, said method comprising: identifying the highest priority bit, if any, set in a first portion of the data word, and providing an indication of whether zero, one, or multiple bits are set therein; responsive to an indication that multiple bits are set in the first portion of the data word, resetting the highest priority bit and again identifying the highest priority bit, if any, set in the first portion of the data word, and providing an indication of whether zero, one, or multiple bits are set therein; and responsive to an indication that zero bits are set or one bit is set in the first portion of the data word, identifying the highest priority bit, if any, set in a second portion of the data word, and providing an indication of whether zero, one, or multiple bits are set therein.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
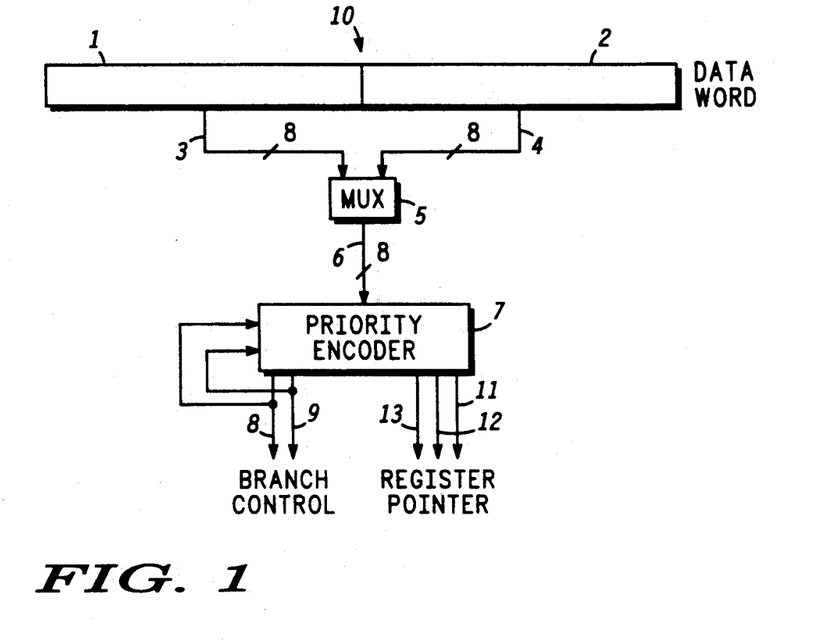
FIG. 1 shows a block diagram of a priority encoder in accordance with the invention.

FIG. 1 shows a block diagram of a priority encoder in accordance with the invention. A 16-bit data word is indicated generally by reference numeral 10 and comprises an 8-bit high order portion 1 and an 8-bit low order portion 2. As will be explained in greater detail below, the low order portion 2 is first transmitted over 8-bit wide bus 4, through multiplexer 5, over 8-bit wide bus 6 into the priority encoder logic 7.

As a result of analysis of the low order portion, a 3-bit binary-coded value is generated over output lines 11–13. This value thus represents a pointer identifying the bit position of highest priority in the low order portion of the data word and, accordingly, to its associated register.

Simultaneously, a 2-bit branch control value is generated over output lines 8 and 9. This value provides an indication of whether zero, one, or multiple bits are set in the low order portion of the data word. The branch control value is fed back into the priority encoder logic 7 where it is used to control its operation, either to continue the analysis of the low order portion of the data word or to proceed with the analysis of the high order portion of the data word.

The branch control value is also output from the circuit and utilized by additional control logic (not illustrated) of a microprocessor to control microcode branching operations.

It will be apparent to one of ordinary skill in the art that the inventive concept can be generalized to an M-bit logic circuit analyzing an N-bit data word (both M and N being integers, with M optimally being less than N), although a preferred embodiment of the present invention is shown and described herein in the form of a logic circuit for analyzing two equal halves of a 16-bit data word (i.e. the logic circuit has N/2 or 8 bits.

Figure 2:
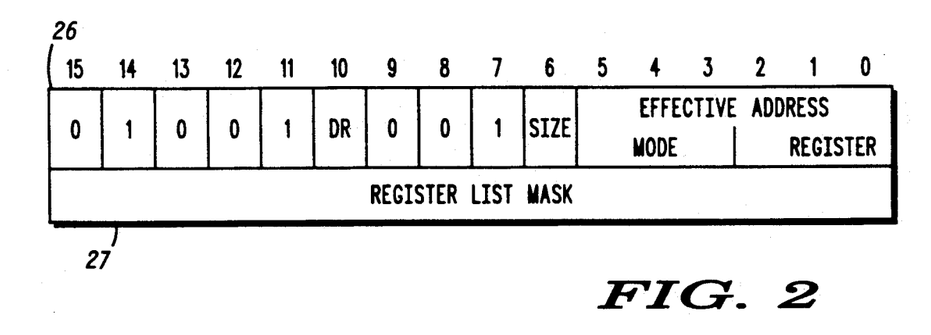
FIG. 2 shows an instruction format for the MOVEM instruction.

FIG. 2 shows an instruction format for the MOVEM (move multiple registers) instruction. The instruction comprises a 16-bit first word 26 called the operation word, which specifies the length of the instruction and the operation to be performed, and a 16-bit second word 27 called an extension word, which provides a Register List Mask (see FIG. 3).

In the MC68040 microprocessor the MOVEM instruction moves the contents of selected registers to or from consecutive memory locations, starting at the location specified by the Effective Address field. A register is selected if the bit in the Register List Mask field corresponding to that register is set. For the purposes of the present invention, additional details concerning the MOVEM instruction and operation word 26 are not relevant.

Figure 3:
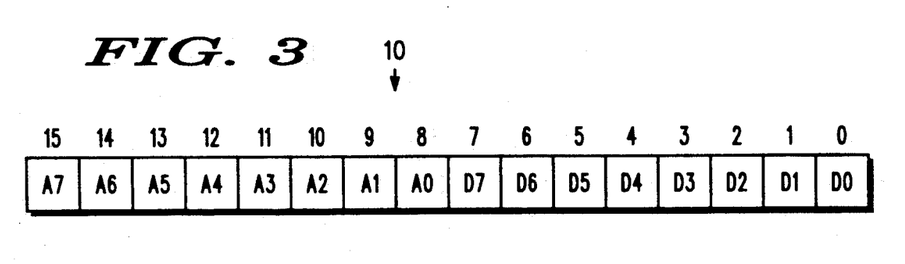
FIG. 3 shows a Register List Mask, illustrating the correspondence between individual registers and bit positions within the data word to be analyzed by a priority encoder in accordance with the invention.

FIG. 3 shows the Register List Mask word of the MOVEM instruction. The Register List Mask illustrates the correspondence between individual registers and bit positions within the data word 10 to be analyzed by a priority encoder in accordance with the invention.

The MOVEM instruction of the MC68000 instruction set contains a 16-bit register list corresponding to the sixteen user registers (eight data registers and eight address registers). A logical one in any position means that the corresponding register is to be read from or written to memory (the "dr" field in the operation word 26 specifies the direction of transfer).

In FIG. 3 the designations A7 through A0 refer to address registers, and the designations D7 through D0 refer to data registers. In the present embodiment the lowest order bit (D0) corresponds to the first register to be transferred, and the highest order bit (A7) corresponds to the last register to be transferred. However, the priority could be reversed or otherwise altered.

A partial-sized look-ahead priority encoder is used to specify a binary-coded value representing the least significant bit position in the Register List Mask word that contains a logical one and to further specify branch control information in the form of an indication as to whether zero, one, or multiple bits are set to a logical one in the portion of the Register List Mask word currently under analysis by the priority encoder logic.

Figure 4:
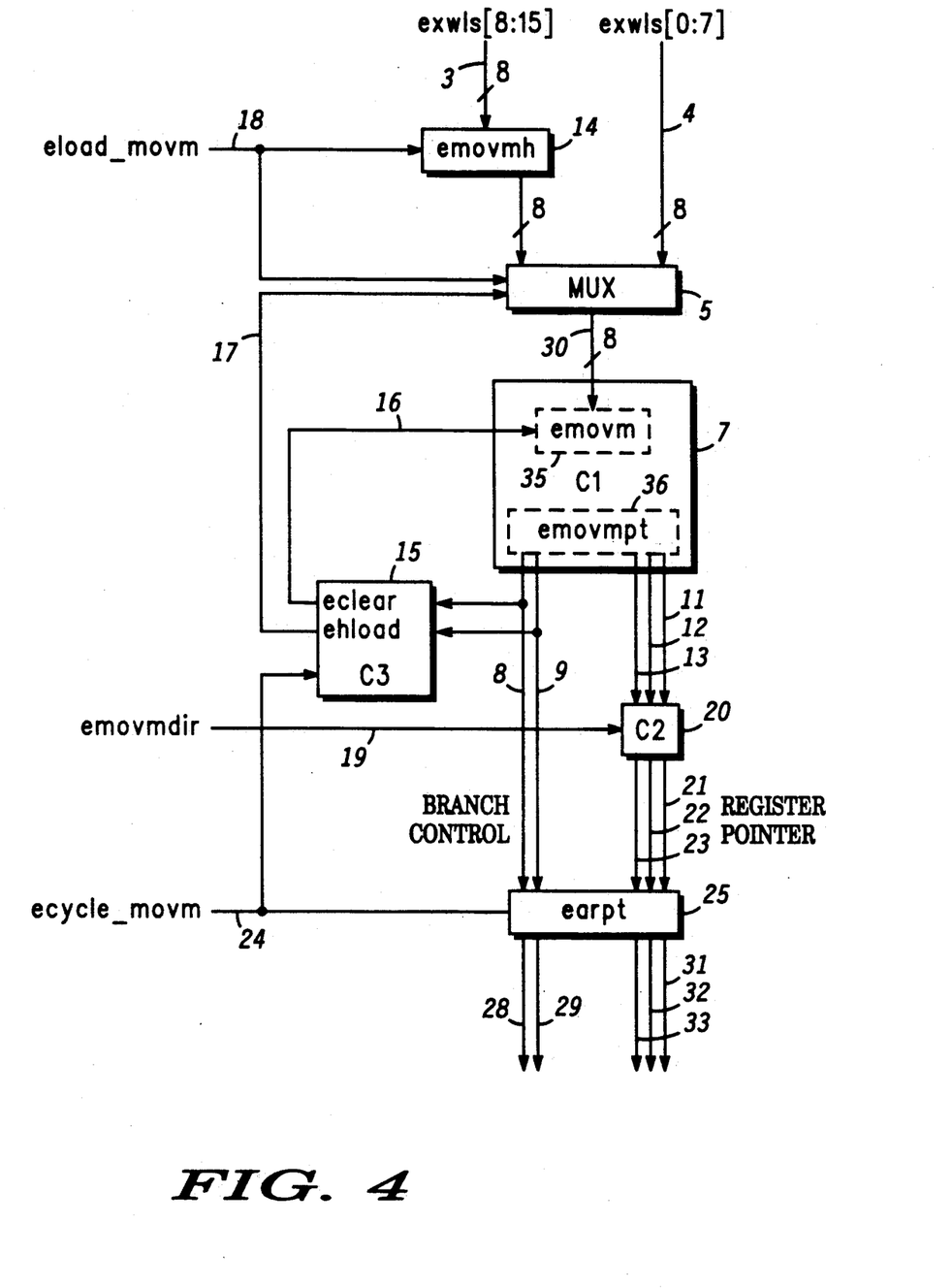
FIG. 4 shows a more detailed block diagram of the priority encoder illustrated in FIG. 1.

FIG. 4 shows a more detailed block diagram of the priority encoder illustrated in FIG. 1. As mentioned previously, the Register List Mask word is located in the pipelined instruction stream and is loaded from the extension word in stage one of the pipe.

The input labelled exwls [15:8] represents the upper eight bits of the Register List Mask word, and the input labelled exwls [7:0] represents the lower eight bits of the Register List Mask word.

The exwls [7:0] portion is transferred via 8-bit bus 4, multiplexer 5, and 8-bit bus 30 into an input latch 35 labelled emovm within priority encoder logic block 7.

The exwls [15:8] portion is transferred via 8-bit bus 3 and latched in a holding register 14 labelled emovmh. This latching occurs on the assertion of the control signal eload_movm applied to register 14 via control line 18. This signal is asserted on the completion of every instruction in this stage of the pipe.

As will be shown in further detail below, the priority encoder analyzes the 8-bit word which is latched in holding register emovm and generates outputs which are latched in an output register 36 labelled emovmpt.

Three of the five bits stored in the emovmpt register are transferred via lines 11-13, respectively, to logic circuit 20 labelled C2. The three bits output by logic circuit C2 designate a register pointer which is transferred via lines 21-23, respectively, into an output register 25 labelled earpt.

The remaining two bits stored in the emovmpt register designate branch control information, which is transferred via lines 8 and 9, respectively, to register earpt and to logic circuit 15 labelled C3.

Logic circuit 15 forms part of the control logic which, based upon the branch control information, controls the operation of MUX 5 and emovm register 35.

Logic circuit 15 utilizes the branch control information to generate an eclear signal over line 16, which is used by the emovm logic to clear the highest order bit that was determined to be set, and, under suitable conditions (as will be explained in greater detail with reference to FIG. 9 below) to generate an ehload signal over line 17, which is used to load the high order portion exwls [15:8] of the data word into the emovm register.

The priority encoder runs every machine cycle, and the result is conditionally used based on the state of the control signal ecycle_movm, the assertion of which is under microcode control.

Microcode selects to use the output of the priority encoder logic 7 by asserting ecycle_movm on line 24. The assertion of ecycle_movm latches the output branch control information and the register pointer information into register earpt. The five bits output by register earpt via lines 28-29 and 31-33 are available to the next stage of a register pipeline.

The assertion of ecycle_movm also enables the clearing of the highest order bit position set in emovm and enables the loading of emovm from emovmh.

According to the MOVEM instruction, the user address and data registers specified by the Register List Mask word loaded in emovm may be either read from or written to memory. The direction is known by microcode from its decoding of the "dr" field in the operation word 26 of the MOVEM instruction, and the microcode reflects the direction by setting the state of the emovmdir control signal via line 19.

Thus, the least significant bit of the Register List Mask word may indicate register D0 or register A7, depending upon which microcode is executing. If emovmdir is asserted, a simple one's complement function is performed on the output register pointer. If emovmdir is not asserted, the output register pointer is transmitted unchanged.

Figure 5:
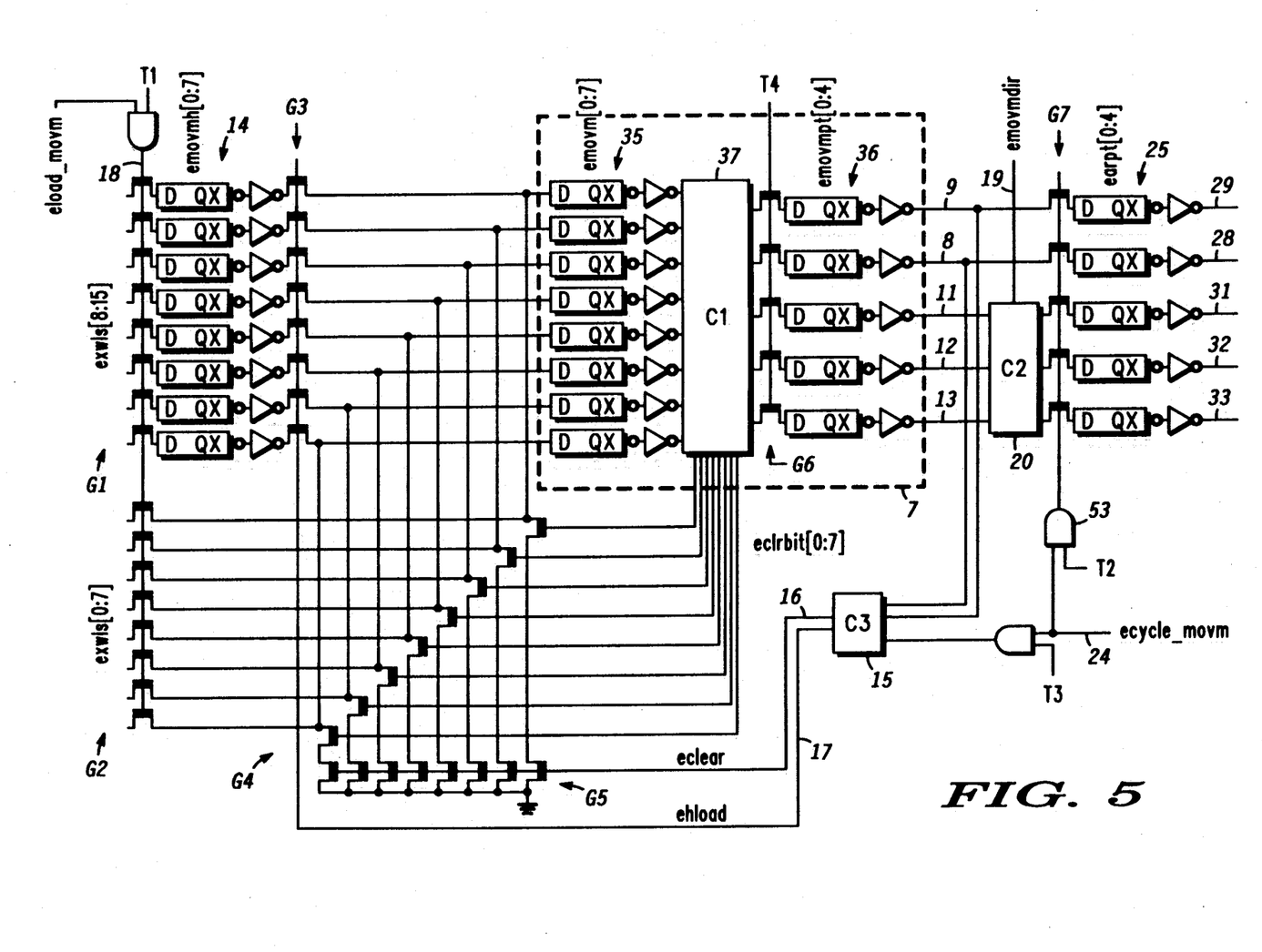
FIG. 5 shows a logic diagram of the priority encoder illustrated in FIG. 1.

FIG. 5 shows a logic diagram of the priority encoder illustrated in FIGS. 1 and 4. In FIG. 5 the emovmh register 14 is shown as comprising eight latches emovmh [0:7]. The emovm register 35 comprises eight latches emovm [0:7]. The emovmpt register 36 comprises five latches emovmpt [0:4]. And the earpt register 25 comprises five latches earpt [0:4]. All of the above-mentioned latches used to implement this aspect of the invention are inverting latches; consequently, inverters are utilized at their outputs to return the output signals to a non-inverted state.

The eload_movm signal is logically ANDed with a clock signal t1, and the output enables transfer gates shown generally as G1 coupled to the inputs of the emovmh latches and enables transfer gates shown generally as G2 coupled to the inputs of the emovm latches. The outputs of the emovmh latches are coupled to respective ones of the inputs of the emovm latches via transfer gates indicated generally as G3, whose control terminals are coupled to the ehload output of logic circuit 15.

The inputs to the emovm latches are tied to ground via respective pairs of transfer gates indicated generally as G4 and G5. The control terminals of transfer gates G4 are coupled to respective outputs from logic circuit 37, and the control terminals of transfer gates G5 are coupled to the eclear output of logic circuit 15.

The outputs of the emovm latches are applied to logic circuit 37. The five outputs of logic circuit 37 are coupled to the inputs of respective ones of latches emovmpt via respective ones of transfer gates indicated generally as G6, whose control terminals are coupled to clock signal t4.

Two outputs of the emovmpt latches are coupled via lines 8 and 9 to logic circuit 15 and to the inputs of two of the earpt latches, whose outputs are coupled to output lines 28 and 29, respectively. The three remaining outputs 11-13 of the emovmpt latches are coupled to logic circuit 20, whose three outputs are coupled to the inputs of the remaining three of the earpt latches. The outputs of these three earpt latches are coupled to output lines 31-33.

The five inputs to the earpt latches are coupled to transfer gates indicated generally as G7, whose control terminals are coupled to the ecycle_movm signal as enabled by clock signal t2 via AND gate 53. The ecycle_movm signal is also ANDed with clock signal t3 before being coupled to logic circuit 15.

Figure 6:
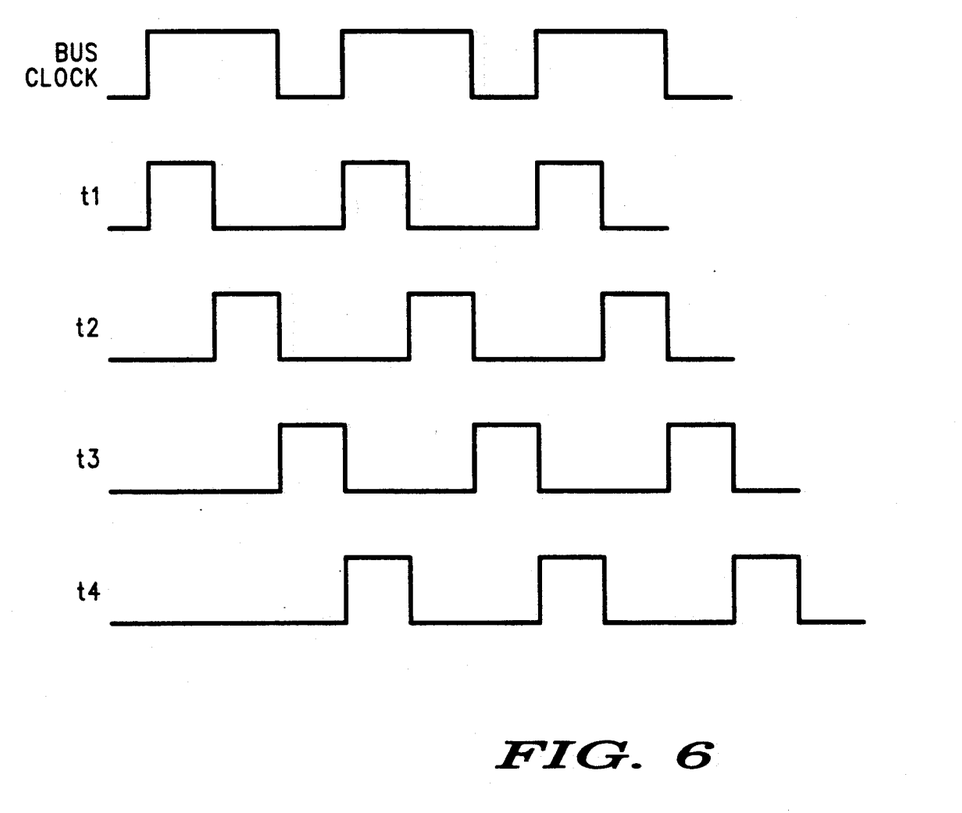
FIG. 6 shows a timing diagram illustrating the clock signals t1 through t4 shown in FIG. 5.

FIG. 6 shows a timing diagram illustrating the clock signals t1 through t4 shown in FIG. 5. Signals t1 through t4 are generated in a sequential, repetitive, non-overlapping fashion, with t1 followed by t2, then t3, and finally t4. The relationship of the system bus clock signal is also shown. The system bus clock rises when t1 rises and falls when t2 falls.

Figure 7:
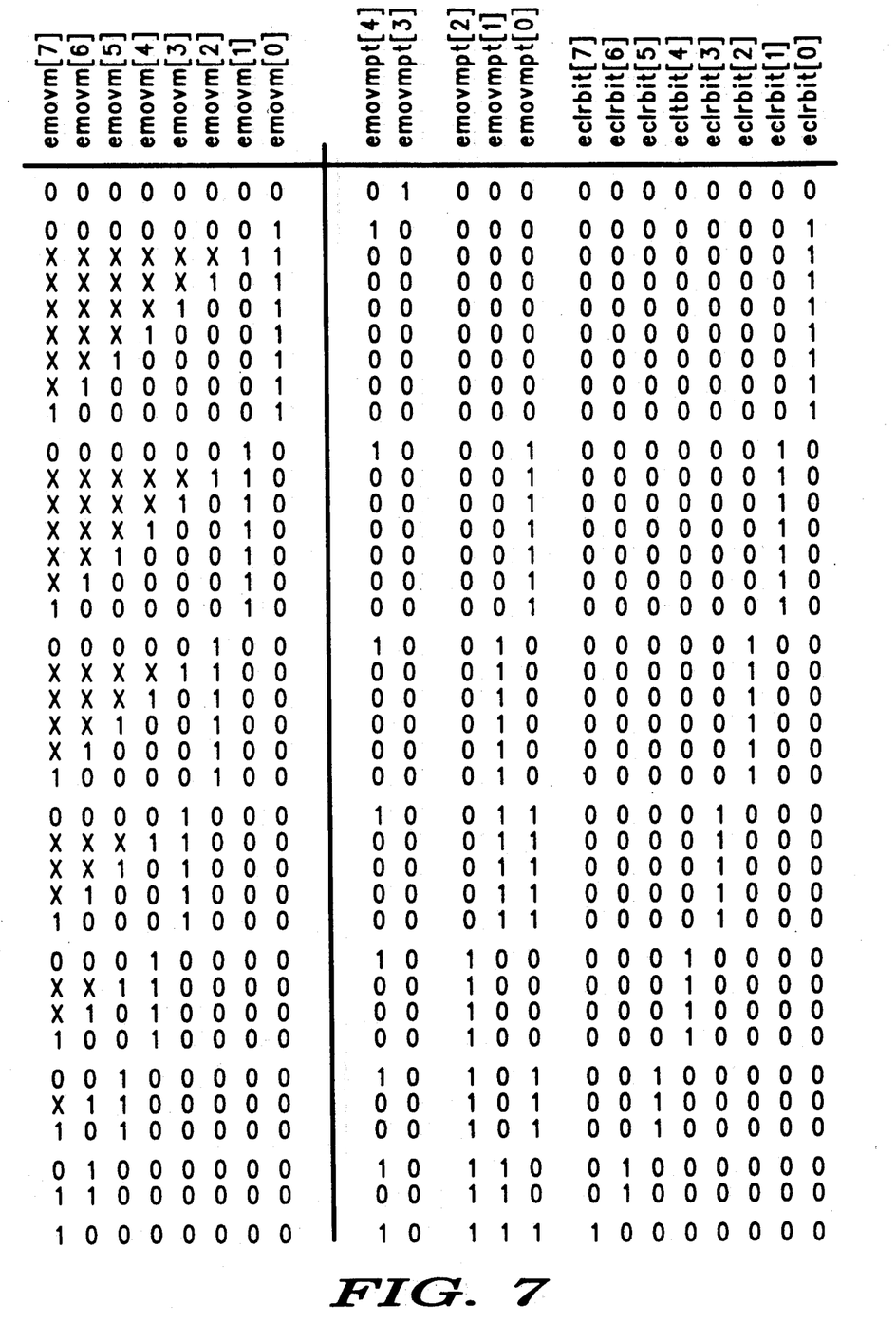
FIG. 7 shows a truth table illustrating the operation of the block labelled "C1" in FIG. 5.

FIG. 7 shows a truth table illustrating the operation of the block labelled C1 in FIG. 5. The truth table of FIG. 7 shows the combinational logic performed by block C1. It will be apparent to one of ordinary skill in the art how to implement this logic in a manner most suitable for the desired implementation of the priority decoder.

The priority encoder takes inputs emovm [7:0] and provides outputs emovmpt [4:0]. The priority encoder functions by searching from the least significant bit of the portion of Register List Mask word stored in emovm to the most significant.

Referring to the first line of the truth table shown in FIG. 7, if zero bits are set in emovm [7:0], i.e. emovm is all zeros, branch control outputs emovmpt [4:3] indicate this with a binary code of 01, the "zero bits set" control designation. The register pointer information, emovmpt [2:0], and the internal clear control, eclrbit [7:0] are unaffected and remain 0.

If only one bit of emovm is set, branch control outputs emovmpt [4:3] are set to a binary code of 10, the "one bit set" control designation. The register pointer information, emovmpt [2:0], is a straight-forward encoding of the bit position which is set (e.g. if bit position emovm [0] is set, emovmpt [2:0] is 000; if emovm [1] is set, emovmpt [2:0] is 001; and so forth).

The internal clear control, eclrbit [7:0], has one bit set in the same position as the one bit which is set in input emovm. This condition corresponds to the first line of each grouping in the table, excluding the very first line of the table.

If two or more bits of emovm are set, branch control outputs emovmpt [4:3] are set to a binary code of 00, the "more than one bit set" control designation. The register pointer information is an encoding of the least significant bit of emovm which is set. The internal clear control, eclrbit [7:0], has one bit set in the same position as the least significant bit which is set of input emovm. This corresponds to the remaining table entries not referenced above.

Figure 8:
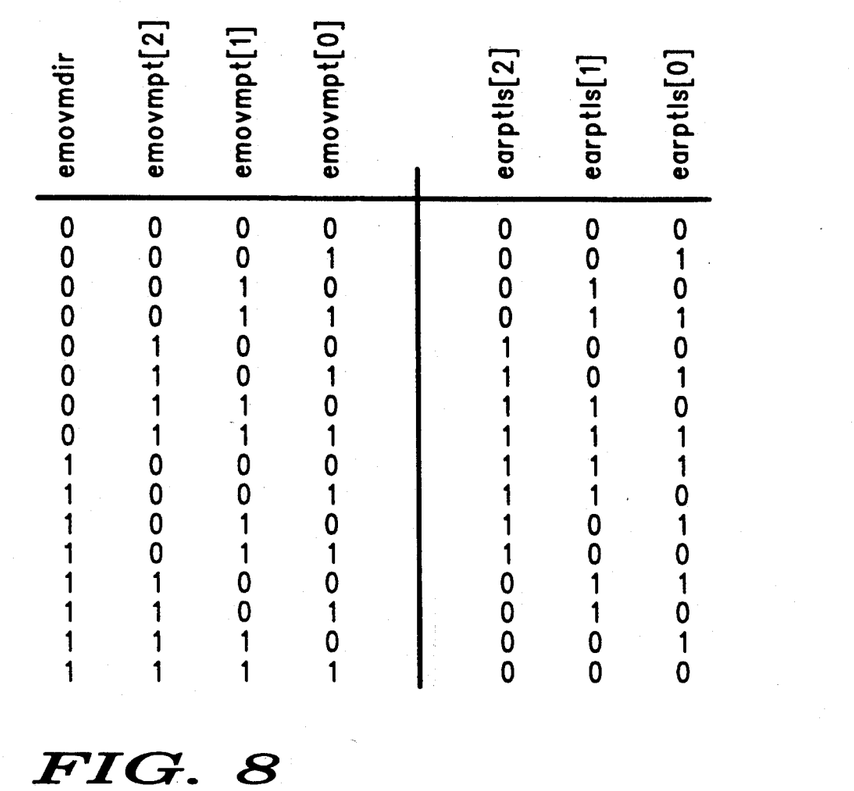
FIG. 8 shows a truth table illustrating the operation of the block labelled "C2" in FIG. 5.

FIG. 8 is a truth table illustrating the combinational logic performed by block C2, which one of ordinary skill in the art can readily implement in the most suitable manner.

The registers specified by the Register List Mask word stored in emovm may be either read from, or written to memory. The microcode reflects the direction by setting the state of emovmdir. As mentioned above, the least significant bit of the register list may indicate register D0 or register A7, depending upon which microcode is executing. If emovmdir is not asserted (i.e. equals a logical "0"), the output register pointer is passed unchanged. If emovmdir is asserted, a simple one's complement function is performed on the output register pointer.

Figure 9:
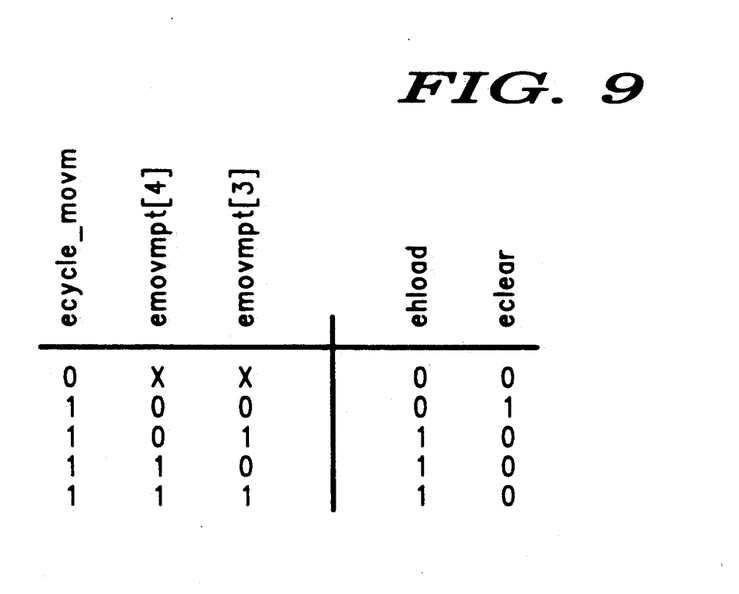
FIG. 9 shows a truth table illustrating the operation of the block labelled "C3" in FIG. 5.

FIG. 9 is a truth table illustrating the combinational logic performed by block C3, which one of ordinary skill in the art can readily implement in the most suitable manner.

As seen in FIG. 5, block C3 is enabled by the assertion of the ecycle—movm signal ANDed with the t3 clock signal. If the ecycle—movm signal is not asserted, then the ehload and eclear signals are also not asserted.

The eclear signal is asserted when ecycle—movm is set and emovmpt [4:3] outputs indicate "more than one" branch control (i.e. 00). The eclear signal enables the clearing of the bit position in emovm selected by eclrbit (refer to FIG. 7), since the input to the corresponding register of emovm [0:7] is thereby tied to ground.

The ehload signal is asserted when ecycle—movm is set and emovmpt [4:3] outputs indicate "zero" (i.e. 01) or "one" (10) branch control. The ehload signal enables the secondary loading of emovm from the emovmh register by turning on the G3 transfer gates. With emovm loaded, it is ready to analyze the priority of the bits within the high order portion of the Register List Mask word in the next machine cycle.

Figure 10:
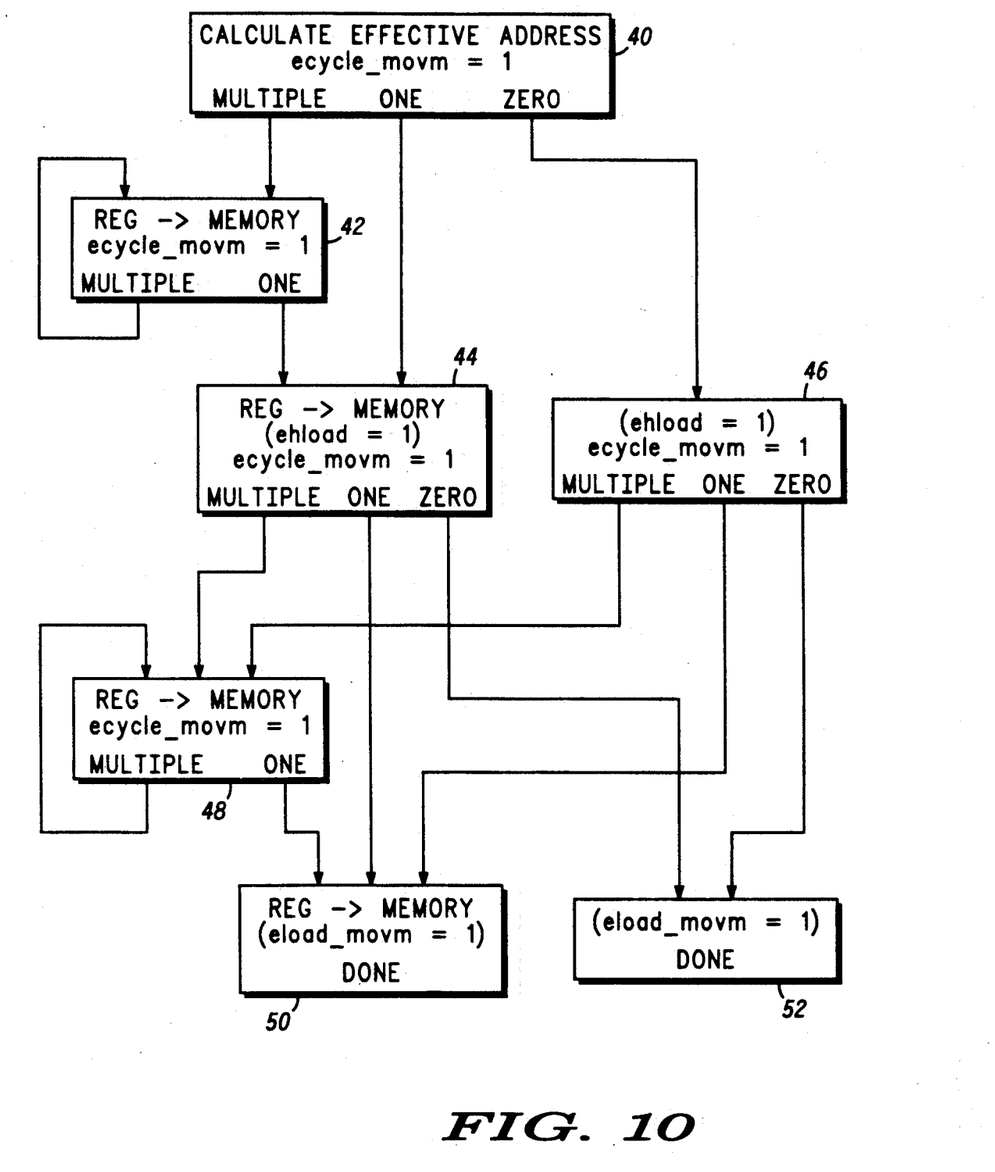
FIG. 10 shows a flow chart of the MOVEM instruction in accordance with the invention.

FIG. 10 shows a flow chart of the MOVEM instruction in accordance with the invention. The flow chart shows how the microcode of the MOVEM instruction uses the branch control information.

As mentioned previously, in the MC68040 different microcode is run in two different execution units. One unit is the effective address unit (EA) which performs effective address calculations, dispatches reads, and tags writes. The other unit is the execution unit (EU), which fetches data from memory and registers and performs operations on it.

The MC68040 address registers are located in the EA core, and the data registers are located in the EU core. In the MOVEM instruction, microcode keeps track of which registers are being loaded, or written, and from where.

With reference now to box 40 of FIG. 10, it is assumed that register emovm of the priority encoder was loaded by the assertion of eload—movm at the completion of any previous instruction and has already completed an operational cycle before the EA microcode for the MOVEM instruction has begun.

Box 40 shows that the microcode branches depending upon whether there are zero, one, or multiple bits set in the first half of the Register List Mask word.

Box 42 shows that if "more than one" is indicated, the EA continues to dispatch reads or tag writes until "one" is indicated.

When "zero" or "one" is indicated (in either box 40 or box 42), the second half of the Register List Mask word is loaded (refer to box 44 or box 46, showing ehload = 1), and the sequence is repeated one more time, branching on "zero" (to box 52) and immediately concluding; branching on "one" (to box 50) and concluding after the final register transfer; or branching on "more than one" (to box 48) and continuing register transfers until "one" is indicated. At the completion of this instruction, as with any, eload—movm is set to a logical one. This again prepares the priority encoder for possible use by the next instruction.

It is important to note that the look-ahead ability of the priority encoder allows the second load to be overlapped with the dispatching of the last read from the first load of the priority encoder. The microcode branches on the output from the first half of the Register List Mask word in one machine cycle and then can branch on the output of the second half of the Register List Mask word in the next machine cycle without incurring any loss for the load.

The branch control information and the register pointer are pipelined to the EU. The EU microcode has a duplicate set of branches. The EU moves the registers to or from memory. There is no dead machine cycle at the second load or at the completion of the second half of the Register List Mask word, as might be expected. Because of the look-ahead ability, the microcode can perform the last transfer knowing that it is finished with the MOVEM instruction.

In known microprocessors utilizing priority encoders, microcode would perform the last transfer, then look for an indication that the list was now "zero". Knowing this, the instruction was then completed. However, no register could be transferred in this last machine cycle of the instruction.

Figure 11:
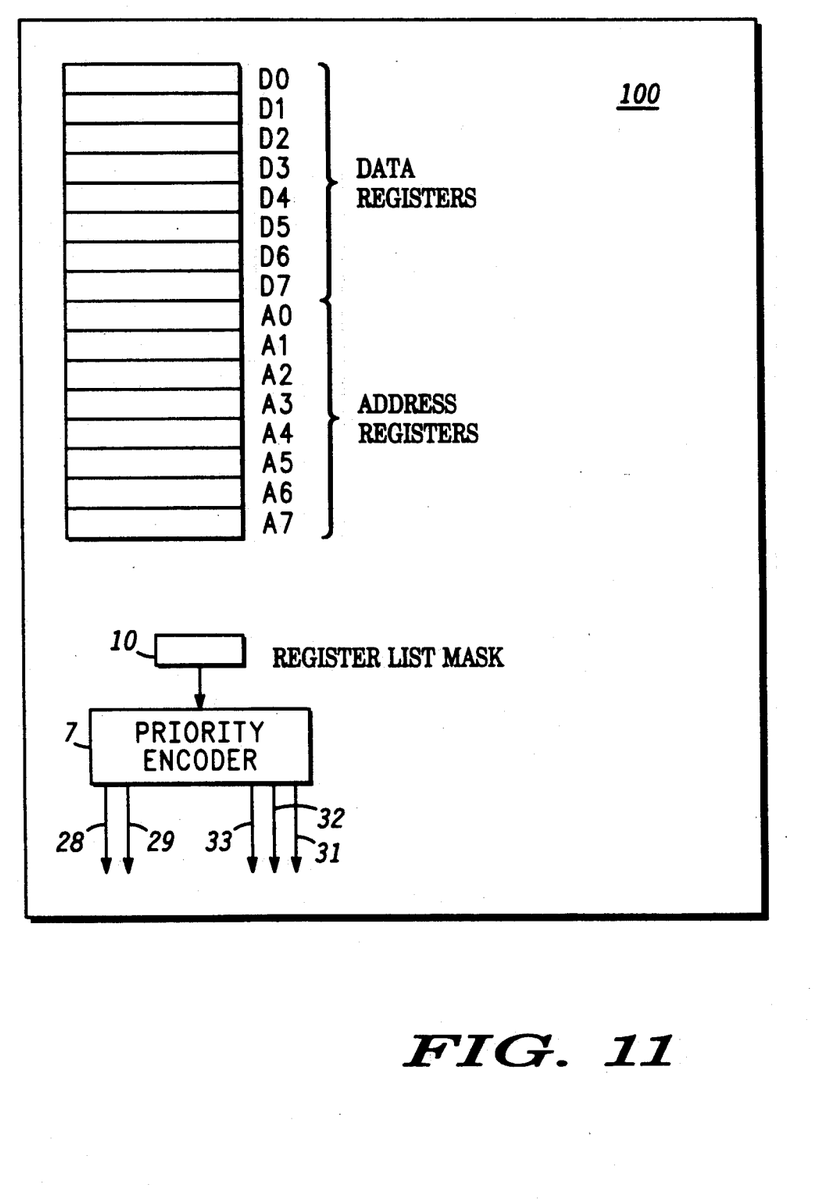
FIG. 11 shows a conceptual view of a microprocessor chip comprising a priority encoder in accordance with the invention.

FIG. 11 shows a conceptual view of a microprocessor or microcomputer integrated circuit, indicated generally by reference numeral 100, comprising a priority encoder 7 in accordance with the invention. Data registers D0–D7 and address registers A0–A7 are shown, as is Register List Mask 10. Also shown is priority encoder 7, which is responsive to Register List Mask 10. Priority encoder 7 generates two branch control outputs via lines 28 and 29 and a 3-bit register pointer via lines 31–33, as described above.

It will be understood by one of ordinary skill that the implementation of a microprocessor or microcomputer comprises many more elements than are illustrated in FIG. 11, and that FIG. 11 is provided to illustrate merely one use of the priority encoder—i.e. on an integrated circuit microprocessor. It will also be understood that the elements shown in FIG. 11 are not necessarily to scale in relationship to each other or to other elements of the integrated circuit.

Thus, in summary, the present invention provides a highly efficient priority encoder circuit which contributes to the overall processing speed of an integrated circuit microprocessor in which it may be incorporated. In addition, the design of the circuit is especially conserving of silicon area, thereby reducing the cost of manufacture and expanding the commercial utilization of microprocessor technology.

It will be apparent to those skilled in the art that the disclosed invention may be modified in numerous ways and may assume many embodiments other than the preferred form specifically set out and described above.

For example, while the present disclosure discusses a half-sized priority encoder for a 16-bit word, the inventive concept could also be extended to other desired sub-divisions of an N-bit data word, e.g. a quarter-sized or third-sized priority encoder.

Moreover, each portion of the data word need not necessarily be of the same length. Also, the size of the logic circuit M could conceivably be greater than the size N of the data word if only a portion (less than N) of such logic circuit is used to analyze a portion of the data word at a time.

Accordingly, it is intended by the appended claims to cover all modifications of the invention which fall within the true spirit and scope of the invention.

What is claimed is:

1. A priority encoder circuit for identifying a highest priority bit set in an N-bit data word, where N is a first integer value, said N-bit data word having a first portion and a second portion, said circuit comprising:
   an M-bit logic circuit, where M is a second integer value, said M-bit logic circuit responsive to said first portion of said data word, for identifying the highest priority bit, if any, set in said first portion of said data word, and for generating an output signal indicating whether zero, one, or multiple bits are set therein;
   control logic, responsive to an indication that multiple bits are set in said first portion of said data word, for resetting said highest priority bit and causing said logic circuit again to identify the highest priority bit, if any, set in said first portion of said data word, and to again generate said output signal indicating whether zero, one, or multiple bits are set therein; and
   said control logic, responsive to an indication that zero bits are set or one bit is set in said first portion of said data word, causing said logic circuit to identify the highest priority bit, if any, set in a second portion of said data word, and to generate said output signal indicating whether zero, one, or multiple bits are set therein.

2. The priority encoder circuit recited in claim 1, wherein M is less than N.

3. The priority encoder circuit recited in claim 1, wherein said control logic, responsive to an indication that multiple bits are set in said second portion of said data word, resets said highest priority bit and causes said logic circuit again to identify the highest priority bit, if any, set in said second portion of said data word, and to generate said output signal to indicate whether zero, one, or multiple bits are set therein;
   said control logic, responsive to an indication that zero bits are set or one bit is set in said second portion of said data word, causing said logic circuit to identify the highest priority bit, if any, set in a next succeeding portion of said data word, and to generate said output signal to indicate whether zero, one, or multiple bits are set therein; and
   said control logic analyzing said next succeeding portion and any subsequent portions in similar fashion until no further bits of said data word remain in a set state.

4. The priority encoder circuit recited in claim 1, wherein said output signal generated by said logic circuit to identify said highest priority bit set in said first portion of said data word is a first binary-coded value.

5. The priority encoder circuit recited in claim 1, wherein said output signal generated by said logic circuit to identify said highest priority bit set in said second portion of said data word is a second binary-coded value.

6. The priority encoder circuit recited in claim 1, further comprising a register for temporarily holding said second portion of said data word and wherein said control logic loads said second portion of said data word from said register into said logic circuit in response to receiving said first binary coded value indicating that zero bits are set or one bit is set in said first portion of said data word.

7. The priority encoder circuit recited in claim 6, wherein said control logic is coupled between said register and said logic circuit.

8. A priority encoder circuit for identifying the highest priority bit set in an N-bit data word, where N is an integer value, said circuit comprising:
   an N/2 bit logic circuit, responsive to a first half of said data word, for identifying the highest priority bit set in said first half of said data word, and for generating an output signal indicating whether zero, one, or multiple bits are set therein;
   an N/2 bit register for holding a second half of said data word;
   control logic, responsive to an indication that multiple bits are set in said first half of said data word, for resetting said highest priority bit and causing said N/2 bit logic circuit again to identify the highest priority bit, if any, set in said first half of said data word, and to generate said output signal indicating whether zero, one, or multiple bits are set therein; and said control logic, responsive to an indication that zero bits are set or one bit is set in said first half of said data word, loading said second half of said data word from said N/2 bit register into said N/2 bit logic circuit and causing said N/2 bit logic circuit to identify the highest priority bit, if any, set in said second half of said data word, and to generate said output signal indicating whether zero, one, or multiple bits are set therein.

9. The priority encoder circuit recited in claim 8, wherein said output signal generated by said logic circuit to identify said highest priority bit set in said first half of said data word is a first binary-coded value.

10. The priority encoder circuit recited in claim 8, wherein said output signal generated by said logic circuit to identify said highest priority bit set in said second half of said data word is a second binary-coded value.

11. The priority encoder circuit recited in claim 8, wherein said control logic is coupled between said N/2 bit register and said N/2 bit logic circuit.

12. A priority encoder circuit in an integrated circuit microprocessor for identifying the highest priority bit set in an N-bit data word, said circuit comprising:

an N/2 bit logic circuit, responsive to a first half of said data word, for identifying the highest priority bit set in said first half of said data word, and for generating an output signal to indicate whether zero, one, or multiple bits are set therein;

an N/2 bit register for holding a second half of said data word;

control logic, responsive to an indication that multiple bits are set in said first half of said data word, for resetting said highest priority bit and causing said N/2 bit logic circuit again to identify the highest priority bit, if any, set in said first half of said data word, and to again generate said output signal indicating whether zero, one, or multiple bits are set therein; and said control logic, responsive to an indication that zero bits are set or one bit is set in said first half of said data word, loading said second half of said data word from said N/2 bit register into said N/2 bit logic circuit and causing said N/2 bit logic circuit to identify the highest priority bit, if any, set in said second half of said data word, and to generate said output signal indicating of whether zero, one, or multiple bits are set therein.

13. The priority encoder circuit recited in claim 12, wherein said output signal generated by said logic circuit to identify said highest priority bit set in said first half of said data word is a first binary-coded value.

14. The priority encoder circuit recited in claim 12, wherein said output signal generated by said logic circuit to identify said highest priority bit set in said second half of said data word is a second binary-coded value.

15. The priority encoder circuit recited in claim 12, wherein said control logic is coupled between said N/2 bit register and said N/2 bit logic circuit.

16. A method for identifying a highest priority bit set in an N-bit data word, said method comprising the steps of:

identifying the highest priority bit, if any, set in a first portion of said data word, and providing an output signal indicating whether zero, one, or multiple bits are set therein;

responding to an indication that multiple bits are set in said first portion of said data word by resetting said highest priority bit and again identifying the highest priority bit, if any, set in said first portion of said data word, and again providing said output signal indicating whether zero, one, or multiple bits are set therein; and responding to an indication that zero bits are set or one bit is set in said first portion of said data word by identifying the highest priority bit, if any, set in a second portion of said data word, and providing said output signal indicating whether zero, one, or multiple bits are set therein.

17. The method for identifying the highest priority bit set in an N-bit data word recited in claim 16 and further comprising the steps of:

responding to an indication that multiple bits are set in said second portion of said data word by resetting said highest priority bit and again identifying the highest priority bit, if any, set in said second portion of said data word, and providing said output signal indicating whether zero, one, or multiple bits are set therein;

responding to an indication that zero bits are set or one bit is set in said second portion of said data word by identifying the highest priority bit, if any, set in a next succeeding portion of said data word, and providing said output signal indicating whether zero, one, or multiple bits are set therein; and analyzing said next succeeding portion and any subsequent portions in similar fashion until no further bits of said data word remain in a set state.

18. A method for identifying the highest priority bit set in an N-bit data word, said method comprising the steps of:

identifying the highest priority bit, if any, set in a first half of said data word, and providing an output signal indicating whether zero, one, or multiple bits are set therein;

responding to an indication that multiple bits are set in said first half of said data word by resetting said highest priority bit and again identifying the highest priority bit, if any, set in said first half of said data word, and providing said output signal indicating whether zero, one, or multiple bits are set therein;

responding to an indication that zero bits are set or one bit is set in said first half of said data word by identifying the highest priority bit, if any, set in a second half of said data word, and providing said output signal indicating whether zero, one, or multiple bits are set therein;

responding to an indication that multiple bits are set in said second half of said data word by resetting said highest priority bit and again identifying the highest priority bit, if any, set in said second half of said data word, and providing said output signal indicating whether zero, one, or multiple bits are set therein; and responding to an indication that zero bits are set or one bit is set in said second half of said data word, concluding said method with respect to said N-bit data word.

19. A method for identifying the highest priority bit set in an N-bit data word stored in an integrated circuit microprocessor, said method comprising the steps of:

identifying the highest priority bit, if any, set in a first half of said data word, and providing an output signal indicating whether zero, one, or multiple bits are set therein;

responding to an indication that multiple bits are set in said first half of said data word by resetting said highest priority bit and again identifying the highest priority bit, if any, set in said first half of said data word, and providing said output signal indicating whether zero, one, or multiple bits are set therein;

responding to an indication that zero bits are set or one bit is set in said first half of said data word by identifying the highest priority bit, if any, set in a second half of said data word, and providing said output signal indicating whether zero, one, or multiple bits are set therein;

responding to an indication that multiple bits are set in said second half of said data word by resetting said highest priority bit and again identifying the highest priority bit, if any, set in said second half of said data word, and providing said output signal indicating whether zero, one, or multiple bits are set therein; and responding to an indication that zero bits are set or one bit is set in said second half of said data word, concluding said method with respect to said N-bit data word.

* * * * *